United States Patent
Harris et al.

(10) Patent No.: US 8,945,785 B2
(45) Date of Patent: Feb. 3, 2015

(54) ADAPTIVE LIMITATION OF STANDBY MODE TO ENHANCE FUEL CELL SYSTEM LIFE

(75) Inventors: Daniel I. Harris, Honeoye Falls, NY (US); Derek R. Lebzelter, Fairport, NY (US); John P. Salvador, Penfield, NY (US); William H. Pettit, Rochester, NY (US); Akbar Chowdhury, Pittsford, NY (US); Edward G. Himes, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 625 days.

(21) Appl. No.: 13/345,288

(22) Filed: Jan. 6, 2012

(65) Prior Publication Data

US 2013/0177826 A1      Jul. 11, 2013

(51) Int. Cl.
  *H01M 8/04* (2006.01)
(52) U.S. Cl.
  USPC ............ 429/428; 429/430; 429/432; 429/429
(58) Field of Classification Search
  USPC .......................... 429/408–427, 429–451, 428
  See application file for complete search history.

(56) References Cited

U.S. PATENT DOCUMENTS

2009/0253000 A1*  10/2009  Song et al. ................... 429/17

* cited by examiner

*Primary Examiner* — Basia Ridley
*Assistant Examiner* — Caitlin Wilmot
(74) *Attorney, Agent, or Firm* — John A. Miller; Miller IP Group, PLC

(57) ABSTRACT

A system and method for reducing the frequency of stack stand-by mode events, if necessary, as a fuel cell stack ages and experiences lower performance. The method determines an irreversible voltage loss of the fuel cell stack at predetermined time intervals and determines a stack voltage degradation variable based on the irreversible voltage loss. The method also determines if the stack voltage degradation variable indicates that the fuel cell stack will not meet predetermined stack end-of-life voltage requirements and calculates a maximum allowed voltage degradation rate of the fuel cell stack. The method calculates a maximum number of stand-by mode events per unit time that can be allowed to prevent the stack from exceeding the maximum allowed degradation rate and controls the number of stand-by mode events based on the calculated maximum number of stand-by mode events.

20 Claims, 2 Drawing Sheets

ADAPTIVE LIMITATION OF STANDBY MODE TO ENHANCE FUEL CELL SYSTEM LIFE

BACKGROUND OF THE INVENTION

1. Field of the Invention

This invention relates generally to a system and method for reducing the frequency of fuel cell stack stand-by mode events as the fuel cell stack ages, if necessary, and, more particularly, to a system and method for reducing the frequency of fuel cell stack stand-by mode events as the fuel cell stack ages by determining the irreversible stack voltage loss, and from that assessing if the rate of voltage degradation is too high, where the voltage would be expected to decay below a predetermined limit before the rated end-of-life service of the stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

When the fuel cell system is in an idle mode, such as when the fuel cell vehicle is stopped at a stop light, where the fuel cell stack is not generating power to operate system devices, cathode air and hydrogen gas are generally still being provided to the fuel cell stack, and the stack is generating output power. Providing hydrogen gas to the fuel cell stack when it is in the idle mode is generally wasteful because operating the stack under this condition is not producing very much useful work. Thus, it is generally desirable to reduce stack output power and current draw during these idle conditions to improve system fuel efficiency.

For these and other fuel cell system operating conditions, it may be desirable to put the system in a stand-by mode where the system is consuming little or no power, the quantity of fuel being used is minimal and the system can quickly recover from the stand-by mode so as to increase system efficiency and reduce system degradation. U.S. patent application Ser. No. 12/723,261, titled Standby Mode for Optiminazation of Efficiency in Durability of a Fuel Cell Vehicle Application, filed Mar. 12, 2010, assigned to the assignee of this application and herein incorporated by reference, discloses one known process for putting a fuel cell system on a vehicle in a stand-by mode to conserve fuel of this type.

There are a number of mechanisms from the operation of a fuel cell system that cause permanent loss of stack performance, such as loss of catalyst activity, catalyst support corrosion and pinhole formation in the cell membranes. However, there are other mechanisms that can cause stack voltage losses that are substantially reversible, such as the cell membranes drying out, catalyst oxide formation, and build-up of contaminants on both the anode and cathode side of the stack. It is known in the art to remove the oxide formations and the build-up of contaminants, as well as to rehydrate the cell membranes, to recover losses in cell voltage in a fuel cell stack. U.S. patent application Ser. No. 12/580,912, titled Automated Procedure For Executing In-Situ Fuel Cell Stack Reconditioning, filed Oct. 16, 2009, assigned to the assignee of this application and herein incorporated by reference, discloses one such procedure for reconditioning a fuel cell stack to recover reversible voltage loss.

The membrane within a fuel cell needs to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

Wet operation of a fuel cell stack, that is, operation with a high amount of humidification, is desirable for system performance and contaminant removal. However, there are various reasons to operate a fuel cell stack with a lower humidification. For example, wet operation can lead to fuel cell stability problems due to water build up, and could also cause anode starvation resulting in carbon corrosion. In addition, wet operation can be problematic in freeze conditions due to liquid water freezing at various locations in the fuel cell stack.

To meet vehicle acceleration and grade ability requirements at predicted stack end-of-life (EOL) or end-of-service (EOS), the stack voltage must be maintained above a predetermined limit. Permanent stack voltage loss is predominantly related to loss of cathode electrode performance, which in turn is a function of voltage cycling characteristics. When the fuel cell system enters the stand-by mode if the stack voltage falls towards 0 volts, the subsequent increase in stack voltage after the fuel cell system exits the stand-by mode causes some irreversible voltage degradation as a result of catalyst activity loss.

Because of their operating profile, a small subset of vehicle drivers could cause accelerated fuel cell stack degradation rates, resulting in unacceptable performance at the end of the vehicle's target life. In contrast, it has been shown that the driving characteristics of most fuel cell vehicle operators are such that the number of times that their vehicle cycles through the stand-by modes is low enough that fuel cell degradation caused by the voltage cycling referred to above is not enough to cause unacceptable performance loss prior to the stack's target end of life. The high severity drivers would experience poorer fuel economy if they were not permitted to enter the stand-by mode when the vehicle idles. Optimizing both vehicle life and peak system efficiency, which includes enabling the stand-by mode, is not possible with current fuel cell systems.

SUMMARY OF THE INVENTION

In accordance with the teachings of the present invention, a system and method are disclosed for reducing the frequency of stack stand-by mode events, if necessary, as a fuel cell stack ages and experiences lower performance. The method determines an irreversible voltage loss of the fuel cell stack at predetermined time intervals and determines a stack voltage degradation variable based on the irreversible voltage loss. The method also determines if the stack voltage degradation variable indicates that the fuel cell stack will not meet predetermined stack end-of-life voltage requirements and calculates a maximum allowed voltage degradation rate of the fuel cell stack if the stack voltage degradation variable indicates that the fuel cell stack will not meet the predetermined stack end-of-life voltage requirements. The method calculates a maximum number of stand-by mode events per unit time that can be allowed to prevent the stack from exceeding the maximum allowed degradation rate and controls the number of stand-by mode events based on the calculated maximum number of stand-by mode events.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system that reduces the frequency of fuel cell stack stand-by based on estimated irreversible stack voltage degradation is merely exemplary in nature, and is in no way intended to limit the invention or its applications or uses. For example, the present invention has particular application for a fuel cell system on a vehicle. However, as will be appreciated by those skilled in the art, the system and method of the invention may have other applications.

Figure 1:
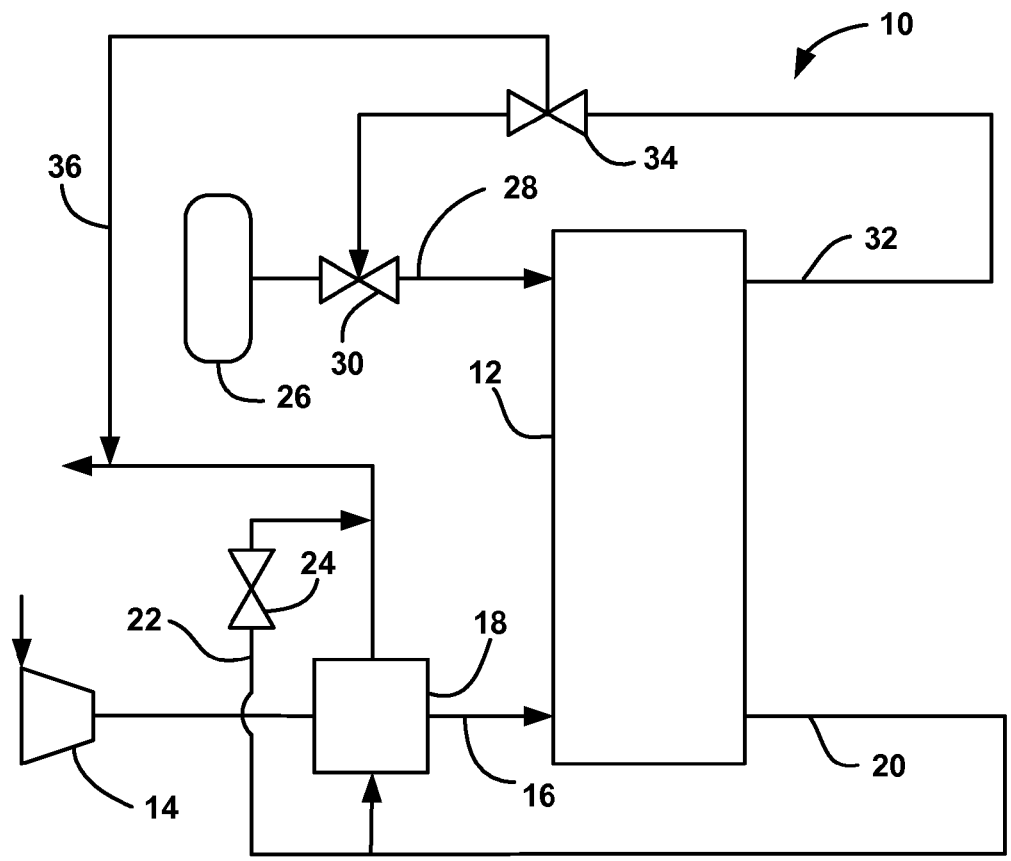
FIG. 1 is a simple schematic block diagram of a fuel cell system.

FIG. 1 is a schematic block diagram of a fuel cell system 10 including a fuel cell stack 12. A compressor 14 provides airflow to the cathode side of the fuel cell stack 12 on a cathode input line 16 through, for example, a water vapor transfer (WVT) unit 18 that humidifies the cathode input air. A cathode exhaust gas is output from the stack 12 on a cathode exhaust gas line 20, which directs the cathode exhaust to the WVT unit 18 to provide the humidity to humidify the cathode input air. A by-pass line 22 is provided around the WVT unit 18 to direct some or all of the cathode exhaust gas around the WVT unit 18. In an alternate embodiment, the by-pass line 22 can be an inlet by-pass. A by-pass valve 24 is provided in the by-pass line 22 and is controlled to selectively redirect the cathode exhaust gas through or around the WVT unit 18 to provide the desired amount of humidity to the cathode input air. In an alternate embodiment, the by-pass line 22 may not be required.

The fuel cell stack 12 receives hydrogen from a hydrogen source 26 that injects hydrogen gas into the anode side of the fuel cell stack 12 through anode input line 28 using an injector 30. An anode exhaust gas is output from the fuel cell stack 12 on recirculation line 32 that recirculates the anode exhaust back to the anode input by providing it to the injector 30 that may operate as an injector/ejector, well known to those skilled in the art. One suitable example of an injector/ejector is described in U.S. Pat. No. 7,320,840, entitled "Combination of Injector-Ejector for Fuel Cell Systems," assigned to the assignee of this application and incorporated herein by reference. In an alternate embodiment, the recirculation function of the line 32 could be performed by a pump or compressor instead of an injector/ejector. As is well understood in the art, nitrogen accumulates in the anode side of the stack 12 that reduces the concentration of hydrogen therein, and affects the performance of the system 10. A bleed valve 34 is provided in the recirculation line 32 to periodically bleed the exhaust gas and liquid to remove nitrogen from the anode sub-system. The bleed anode exhaust gas is provided on a bleed line 36 to the cathode exhaust line 20.

As the fuel cell system 10 operates, contamination of the fuel cell electrodes can cause the stack voltage to decrease, but the voltage can be recovered by operating the stack 12 using a technique that removes the contaminants from the electrodes, referred to as voltage recovery, such as disclosed in the '912 application. The voltage recovery function conditions the stack 12 at frequent operating intervals to remove contaminants from the electrodes that cause the reversible voltage loss.

The present invention proposes a system and method for reducing the frequency of operating the fuel cell system 10 in a stand-by mode, if necessary, as the fuel cell stack 12 ages and experiences lower performance so that the fuel cell stack 12 can meet or exceed its desired end-of-life performance criteria. The method determines the irreversible stack voltage loss based on an estimate of the stack polarization curve, and from that assess if the rate of voltage degradation is too high, where the voltage is expected to decay below a predetermined limit before the rated end-of-life service of the stack 12. As is well known in the art, the stack polarization curve is a relationship between stack current and voltage that the system controller determines during fuel stack operation for stack power control, where the relationship changes as the stack ages. Various techniques are known in the art for determining the stack polarization curve, for example, see US Patent Application Publication No. 2008/0182139, published Jul. 31, 2008, titled Algorithm for Online Adaptive Polarization Curve Estimation of a Fuel Cell Stack, assigned to the assignee of this application and herein incorporated by reference. If the rate of voltage degradation is determined to be too high, the system 10 determines the number of stand-by mode events that can occur over a certain time period, such as per hour, to meet the stack end-of-life requirements. The method then limits the number of the stand-by mode events per the time period using the allowed stand-by value to reduce the rate of the irreversible voltage degradation.

Figure 2:
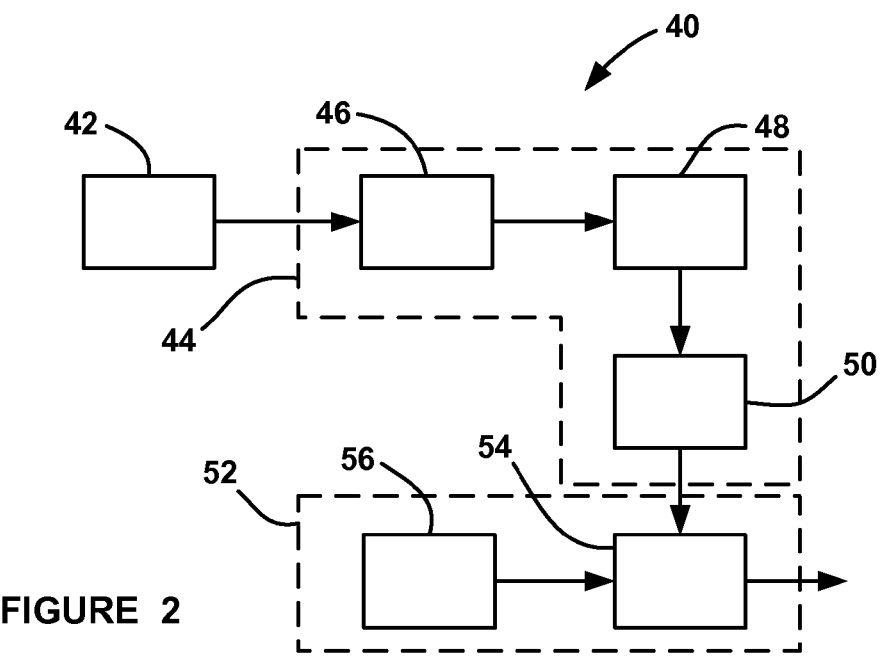
FIG. 2 is a block diagram of a control system.

FIG. 2 is a block diagram of a control process 40 for monitoring the performance of the fuel cell stack 12, determining how many stand-by mode events can be allowed per time period based on that performance, and then limiting the number of stand-by mode events that can occur if the present stand-by mode event occurrence rate is too high to meet the desired stack end-o-life performance.

The control process 40 includes a stack performance predictor (SPP) 42 that determines the irreversible stack voltage loss. In one non-limiting embodiment, the SPP 42 estimates the stack polarization curve for the fuel cell stack 12 to determine the voltage loss. The polarization curve estimate is based on in-vehicle stack performance, and uses performance data across a range of operating conditions, or data over a limited current stack density range, for example, a maximum stack current density, such as 1.5 A/cm$^2$. In an alternate embodiment, stack performance could be estimated by assessing catalyst characteristics during specific assessment protocols. At predetermined adaptation assessment intervals, a voltage degradation variable that identifies the current stack voltage degradation and rate of degradation will be used to determine if a maximum stand-by mode frequency limitation is required. The voltage degradation value is stored in memory that is preserved in the case of battery disconnect or engine control module reprogramming (flash) and reset for a new operating interval each time the maximum stand-by frequency limitation is updated.

Depending on the operating conditions and environment, the system 10 may need to be periodically reconditioned to regain recoverable or reversible cell voltage losses using a voltage recovery process. If an intermittent cell voltage recovery strategy is used, the determination of the irreversible stack voltage loss requires that the SPP 42 perform the stack performance estimation to determine the voltage degradation variable within a predetermined calibration period, such as 10 hours, after the completion of the voltage recovery procedure. Further, because of accelerated degradation at the beginning of the stack's life, controlling or limiting the number of stand-by mode events will only begin after a minimum stack operating time, such as 1000 hours, and be subject to a minimum time between stack performance assessment intervals.

Figure 3:
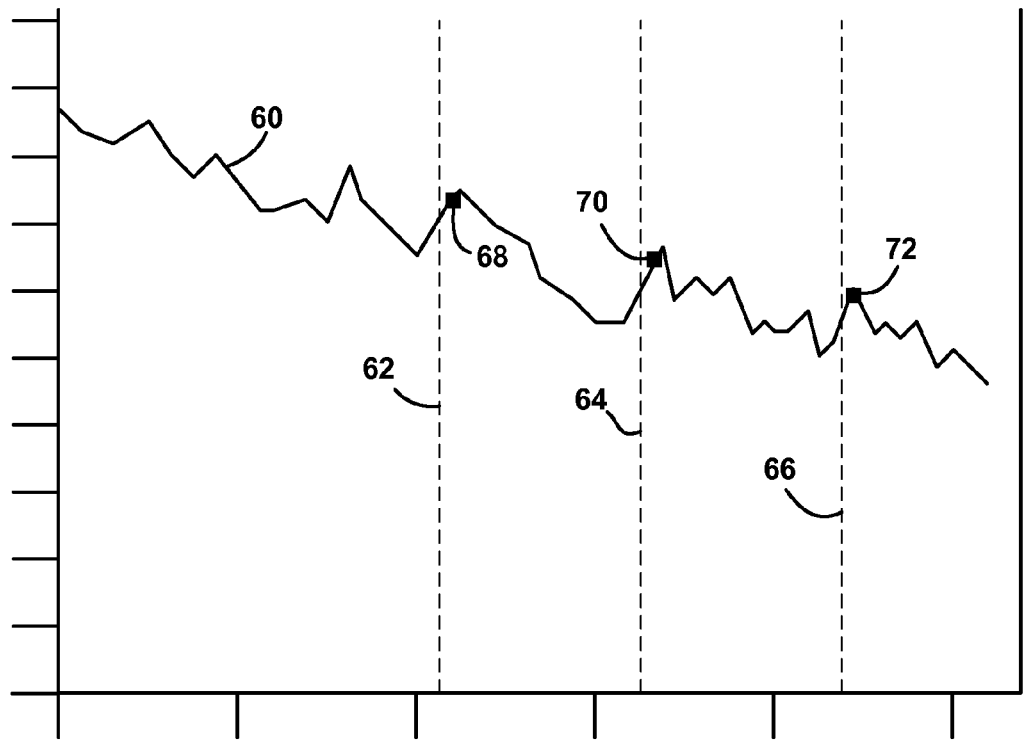
FIG. 3 is a graph with hours on the horizontal axis and average cell voltage on the vertical axis showing the average cell voltage over the life of a fuel cell stack at a high stack current density.

FIG. 3 is a graph with time in hours on the horizontal axis and average cell voltage of the fuel cells in the stack 12 on the vertical axis in milli-volts (mV). Graph line 60 represents the average cell voltage over time as determined by the polarization curve estimation process in the SPP 42. Lines 62, 64 and 66 are times during the operation of the stack 12 that a voltage recovery process is performed to recover the reversible voltage loss of the stack 12. As mentioned above, the SPP 42 will determine the voltage degradation variable within some period of time of the recovery process, for example, at points 68, 70 and 72, so that only the irreversible voltage loss is estimated by the SPP 42.

Once the SPP 42 determines the voltage degradation variable, the process 40 then determines a maximum stand-by mode event frequency at box 44. The process 40 first determines whether enable criteria for recalculating the maximum number of stand-by mode events are met at box 46. One of the enable criteria is whether the stack voltage prediction accurately reflects the stack voltage with recoverable voltage losses removed. Another enable criteria is that the enough time has elapsed since the last maximum stand-by calculation was performed.

If the enable criteria are met, the process 40 determines a maximum allowed voltage degradation rate variable that will allow the stack 12 to achieve its end-of-life voltage performance at box 48. The maximum allowed voltage degradation rate is calculated and updated based on the required remaining total voltage that may still be lost prior to EOS divided by the required amount of time left in the vehicle's useful life. At the adaptation assessment intervals, the maximum allowed voltage degradation rate variable will be used to determine if a maximum stand-by frequency limitation adaptation is required.

Using the maximum allowed voltage degradation rate variable, the process 40 then calculates the maximum number of allowed stand-by mode events for the time period as a reduced stand-by mode event frequency value that will meet the calculated maximum allowable voltage degradation rate at box 50, where the stand-by mode frequency value is determined by the number of full cycle stand-by mode events divided by the stack run per hour. This frequency is calculated by combining the maximum allowed voltage degradation rate variable with estimates of the voltage degradation rate without stand-by, based on operational assumptions and system utilization, and the projected voltage degradation rate of stand-by. A reduced stand-by mode event frequency value should reduce the voltage degradation rate to meet the minimum EOS cell voltage. The maximum stand-by mode frequency value will be stored in memory preserved over battery disconnect and be limited to a minimum and maximum calibration value.

The process 40 then controls the number of stand-by mode events at box 52 based on the maximum number of stand-by mode events allowed from the box 50. The stand-by mode allowed calculation is completed at box 54, and is based on the determined maximum number of allowed stand-by mode events and the present number of stand-by mode events per hour at box 56.

In this example, discussed in more detail below, the present number of stand-by mode events per hour and the maximum allowed number of stand-by mode events per hour are compared, and as the number of stand-by mode events becomes closer to the limitation, the minimum run time between stand-by mode events is increased so that the maximum threshold cannot be exceeded.

Figure 4:
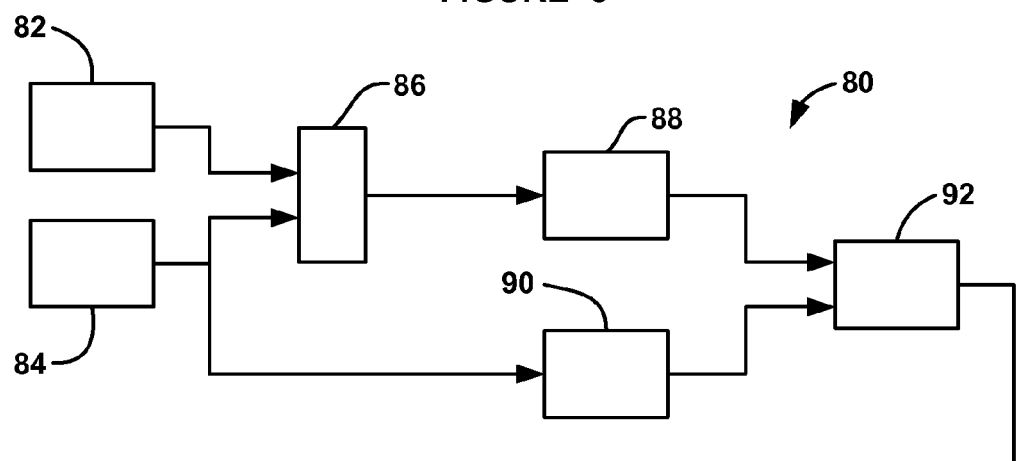
FIG. 4 is a block diagram of a system for limiting fuel cell stack stand-by mode events.
Figure 4:
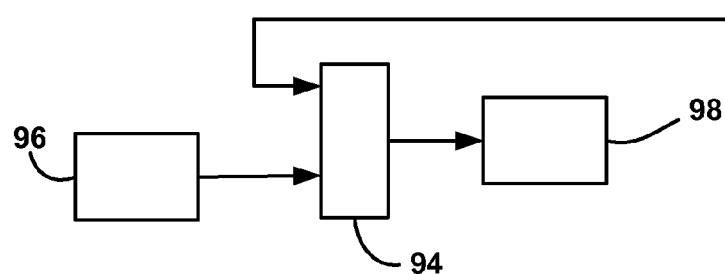

FIG. 4 is a flow chart diagram 80 showing a process for determining the number of allowed stand-by mode events per hour based on the present maximum number of stand-by mode events determined at the box 54. The present number of stand-by mode events per hour run time from the box 56 is provided at box 82 and the calculated maximum number of allowed stand-by mode events from the box 50 is provided at box 84, and are divided at box 86 to give a fraction of limit value. The maximum stand-by mode events allowed per run time is inverted to an average allowed time between stand-by events at box 90. The fraction of stand-by limit value is converted to a minimum run time between stand-by mode events factor at box 88, for example, by Table I below, so that as the fraction of the stand-by limit increases, the minimum run time between stand-by mode factor also increases at a smooth rate. The average allowed time between stand-by events is multiplied by the minimum run time between stand-by mode factor at box 92 to give the time required between the stand-by mode events. This minimum run time between stand-by mode events from the box 92 is then compared at box 94 to a calibrated nominal minimum time between stand-by mode events provided at box 96, which selects the larger of the two as the minimum run time between stand-by mode events at box 98.

If the actual stand-by mode event frequency is greater than the maximum stand-by mode event frequency limitation, system stand-by mode events allowed will be over-ridden whenever a minimum number of full stand-by cycles have not occurred since the last reset of the actual stand-by frequency variable, the system available loads no longer allow suppression of the cell voltages, and an in-situ voltage recovery operation is triggered and active. In these cases, the degradation due to entering the stand-by mode may be less than not entering the stand-by mode, and therefore limiting the stand-by frequency is not desired.

Instead of using the process for the flow diagram 80, another strategy to reduce the frequency of the stand-by mode events is to permit only certain types of stand-by modes. Some types of stand-by modes shut off more ancillaries to save additional power at the cost of system restart time, known as non-dynamic stand-by. Non-dynamic stand-by could be implemented when the vehicle is stopped or when the vehicle is operating at low speeds. Some embodiments would only permit the stand-by mode when the operator has placed the vehicle in park, thus reducing the total number of stand-by mode voltage cycles by eliminating stand-by events when the vehicle is moving. Still another way to reduce the stand-by occurrence would be to adjust the overall vehicle hybridization strategy. The cost function optimization parameters that determine when a stand-by mode event is entered could be changed to transition to stand-by mode less often. If there is a stack durability term in the cost function, its gain could be increased such that the stand-by would be a higher cost.

TABLE I

| Fraction of Limit | Minimum Run Time Between Standby Events As Ratio of Limit |
|---|---|
| 1 | 1 |
| 0.8 | 0.4 |
| 0.7 | 0.2 |
| 0.6 | 0.1 |
| 0.5 | 0 |

Reducing the electrode damage caused by stand-by events can be accomplished in various ways other than those proposed above. One way is to not use the stand-by mode at all. Disabling the stand-by mode procedure has the disadvantage of reduced fuel economy, which is could be 2%-7% depending on the drive cycle. The cell voltage profiled during the exit of stand-by mode could also be further suppressed, which is a major degradation driver, by sinking current from the stack 12. While this would reduce damage, it also presents a problem where to store the power generated by that voltage suppression current. If the battery is cold or overcharged and cannot accept power, the added voltage suppression cannot be applied to the stack.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling the number of stand-by mode events for a fuel cell stack in a fuel cell system, where the stand-by mode events put the fuel cell stack into a low power condition, said method comprising:

determining an irreversible voltage loss of the fuel cell stack at predetermined time intervals;

determining a current stack voltage degradation variable based on the irreversible voltage loss;

determining if the current stack voltage degradation variable indicates that the fuel cell stack will not meet predetermined stack end-of-life voltage performance requirements;

calculating a maximum allowed voltage degradation rate of the fuel cell stack that will meet the predetermined stack end-of-life voltage performance requirements if the stack voltage degradation variable indicates that the fuel cell stack will not meet the predetermined stack end-of-life voltage requirements;

calculating a maximum number of stand-by mode events per unit time that can be allowed to prevent the stack from exceeding the maximum allowed voltage degradation rate; and controlling the number of stand-by mode events based on the calculated maximum number of stand-by mode events per unit time.

2. The method according to claim 1 wherein determining the irreversible stack voltage loss includes estimating a stack polarization curve that defines a relationship between stack current and stack voltage.

3. The method according to claim 2 wherein estimating the stack polarization curve includes estimating the stack polarization curve at a maximum stack current density.

4. The method according to claim 1 wherein determining the irreversible stack voltage loss includes determining the irreversible stack voltage loss only within a predetermined period of time after a stack voltage recovery process is performed that compensates for a reversible stack voltage loss.

5. The method according to claim 1 wherein determining the irreversible stack voltage loss includes determining the irreversible stack voltage loss only after a predetermined minimum number of stack operating hours has occurred.

6. The method according to claim 1 wherein calculating a maximum number stand-by mode events includes calculating the maximum number of stand-by mode events as a number of full cycle stand-by mode events divided by an hour of stack run time.

7. The method according to claim 1 wherein controlling the number of stand-by mode events includes comparing the maximum number of stand-by mode events by a current number of stand-by mode events.

8. The method according to claim 7 wherein controlling the number of stand-by mode events includes dividing the current number of stand-by mode events by the maximum number of stand-by mode events to obtain a fraction of limit value, converting the fraction of limit value to a minimum run time between stand-by mode events, multiplying the minimum run time between stand-by mode events and factor based on the maximum stand-by mode events allowed.

9. The method according to claim 1 wherein controlling the number of stand-by mode events includes preventing stand-by mode events to occur.

10. A method for controlling the number of stand-by mode events for a fuel cell stack in a fuel cell system, where the stand-by mode events put the fuel cell stack into a low power condition, said method comprising:
  determining an irreversible voltage loss of the fuel cell stack at predetermined time intervals including estimating a stack polarization curve that defines a relationship between stack current and stack voltage, wherein estimating the stack polarization curve includes estimating the stack polarization curve at a maximum stack current density, and wherein determining the irreversible stack voltage loss includes determining the irreversible stack voltage loss only within a predetermined period of time after a stack voltage recovery process is performed that compensates for a reversible stack voltage loss;
  determining a current stack voltage degradation variable based on the irreversible voltage loss;
  determining if the current stack voltage degradation variable indicates that the fuel cell stack will not meet predetermined stack end-of-life voltage performance requirements;
  calculating a maximum allowed voltage degradation rate of the fuel cell stack that will meet the predetermined stack end-of-life voltage performance requirements if the stack voltage degradation variable indicates that the fuel cell stack will not meet the predetermined stack end-of-life voltage requirements;
  calculating a maximum number of stand-by mode events per unit time that can be allowed to prevent the stack from exceeding the maximum allowed voltage degradation rate; and
  controlling the number of stand-by mode events based on the calculated maximum number of stand-by mode events per unit time including comparing the maximum number of stand-by mode events by a current number of stand-by mode events.

11. The method according to claim 10 wherein determining the irreversible stack voltage loss includes determining the irreversible stack voltage loss only after a predetermined minimum number of stack operating hours has occurred.

12. The method according to claim 10 wherein calculating a maximum number stand-by mode events includes calculating the maximum number of stand-by mode events as a number of full cycle stand-by mode events divided by an hour of stack run time.

13. The method according to claim 10 wherein controlling the number of stand-by mode events includes dividing the current number of stand-by mode events by the maximum number of stand-by mode events to obtain a fraction of limit value, converting the fraction of limit value to a minimum run time between stand-by mode events, multiplying the minimum run time between stand-by mode events and a factor based on the maximum stand-by mode events allowed.

14. A control system for controlling the number of stand-by mode events for a fuel cell stack in a fuel cell system, where the stand-by mode events put the fuel cell stack into a low power condition, said control system comprising:
  means for determining an irreversible voltage loss of the fuel cell stack at predetermined time intervals;
  means for determining a current stack voltage degradation variable based on the irreversible voltage loss;
  means for determining if the current stack voltage degradation variable indicates that the fuel cell stack will not meet predetermined stack end-of-life voltage performance requirements;
  means for calculating a maximum allowed voltage degradation rate of the fuel cell stack that will meet the predetermined stack end-of-life voltage performance requirements if the stack voltage degradation variable indicates that the fuel cell stack will not meet the predetermined stack end-of-life voltage requirements;
  means for calculating a maximum number of stand-by mode events per unit time that can be allowed to prevent the stack from exceeding the maximum allowed voltage degradation rate; and
  means for controlling the number of stand-by mode events based on the calculated maximum number of stand-by mode events per unit time.

15. The control system according to claim 14 wherein the means for determining the irreversible stack voltage loss estimates a stack polarization curve that defines a relationship between stack current and stack voltage.

16. The control system according to claim 15 wherein the means for determining the irreversible stack voltage loss estimates the stack polarization curve at a maximum stack current density.

17. The control system according to claim 14 wherein the means for determining the irreversible stack voltage loss determines the irreversible stack voltage loss only within a predetermined period of time after a stack voltage recovery process is performed that compensates for a reversible stack voltage loss.

18. The control system according to claim 14 wherein the means for calculating a maximum number stand-by mode events calculates the maximum number of stand-by mode events as a number of full cycle stand-by mode events divided by an hour of stack run time.

19. The control system according to claim 14 wherein the means for controlling the number of stand-by mode events compares the maximum number of stand-by mode events by a current number of stand-by mode events.

20. The control system according to claim 19 wherein controlling the number of stand-by mode events divides the current number of stand-by mode events by the maximum number of stand-by mode events to obtain a fraction of limit value, converting the fraction of limit value to a minimum run time between stand-by mode events, multiplying the minimum run time between stand-by mode events and a factor based on the maximum stand-by mode events allowed.

* * * * *